United States Patent
Bennett et al.

(10) Patent No.: US 8,042,157 B2
(45) Date of Patent: Oct. 18, 2011

(54) SYSTEM FOR RESTRICTING DATA ACCESS

(75) Inventors: Peter Bennett, Nailsea (GB); Andrew Dellow, Minchinhampton (GB)

(73) Assignee: STMicroelectronics Limited, Bristol (GB)

( * ) Notice: Subject to any disclaimer, the term of this patent is extended or adjusted under 35 U.S.C. 154(b) by 1289 days.

(21) Appl. No.: 11/465,535

(22) Filed: Aug. 18, 2006

(65) Prior Publication Data
US 2007/0103997 A1 May 10, 2007

(30) Foreign Application Priority Data

Aug. 19, 2005 (EP) .................................... 05255129

(51) Int. Cl.
*H04L 29/00* (2006.01)

(52) U.S. Cl. ................ 726/4; 726/3; 726/17; 726/18; 726/19; 726/20; 726/21; 725/25; 725/30; 725/31

(58) Field of Classification Search .................. 726/3, 4, 726/17–21
See application file for complete search history.

(56) References Cited

U.S. PATENT DOCUMENTS

| 4,713,753 | A | 12/1987 | Boebert et al. | |
|---|---|---|---|---|
| 4,858,004 | A * | 8/1989 | Kitagaki et al. | 348/396.1 |
| 4,864,542 | A | 9/1989 | Oshima et al. | |
| 5,319,765 | A | 6/1994 | Kimura | |
| 6,073,049 | A * | 6/2000 | Alt et al. | 607/31 |
| 6,381,671 | B1 * | 4/2002 | Ayukawa et al. | 711/104 |
| 6,668,326 | B1 * | 12/2003 | Sella et al. | 726/6 |
| 2002/0170053 | A1 * | 11/2002 | Peterka et al. | 725/31 |
| 2003/0174839 | A1 * | 9/2003 | Yamagata et al. | 380/270 |
| 2004/0123113 | A1 * | 6/2004 | Mathiassen et al. | 713/185 |
| 2005/0086683 | A1 * | 4/2005 | Meyerson | 725/30 |

* cited by examiner

*Primary Examiner* — Vivek Srivastava
*Assistant Examiner* — Helai Salehi
(74) *Attorney, Agent, or Firm* — Lisa K. Jorgenson; Timothy L. Boller; Seed IP Law Group PLLC

(57) ABSTRACT

A filter is arranged to selectively block or allow a data access command from an initiator according to whether the initiator is secure or insecure and whether a data source or destination being accessed is privileged or unprivileged. The data access command contains an identification of the initiator from which the data access command originated and an identification of the data source or destination being accessed. The security filter compares the initiator identification and data source or destination identification contained within the data access command with a list of those initiators defined as secure and a list of those data sources or destinations which are defined as unprivileged. The filter then blocks or allows the data access command signal according to a set of rules.

44 Claims, 3 Drawing Sheets

SYSTEM FOR RESTRICTING DATA ACCESS

BACKGROUND OF THE INVENTION

1. Field of the Invention

The present invention relates to secure devices such as set-top-boxes in pay-television systems in which access to data within the system needs to be restricted.

2. Description of the Related Art

In many electronic devices, access to data by users and other devices may need to be restricted. For example, in subscriber based systems such as pay-television systems, subscribers gain access to services in the form of broadcasts by making payments to a broadcast service provider. It is therefore desirable to prevent unscrupulous parties from gaining access to those broadcasts without making any payments. In order to prevent unauthorized access to data within systems various security features are used. For example, in pay-television systems, broadcast data is usually broadcast over air and received by a set-top-box in an encrypted form. Cryptographic keys are then used to decrypt the data within the set-top-box. In this example, it is desirable to restrict access to data corresponding to the decryption keys used to decrypt encrypted broadcast data, and also to the decrypted broadcast data itself.

The data present within a secure system such as that described above is usually stored in several different memories and data access within a secure system may be requested by several different parts of the system. A device in the system which requests data access is often referred to as an initiator. Since some initiators may be more vulnerable to hacking than others and since some data sources and destinations may contain more sensitive data than others, we have appreciated that it is desirable to restrict the access that some initiators have to some data sources and destinations.

Often, the initiators and the data sources and destinations are accessed through different types of data buses, having different bandwidths or data transfer protocols for example. In this case, when a data access request is transmitted from an initiator to a data source or destination, it may be necessary to convert the format of the request signals when the request passes between busses. We have appreciated that such a conversion process often causes information relating to the origin of the data access request to be lost so that it is then not possible to restrict data accesses at a data source or destination based on the origin of the data access request.

BRIEF SUMMARY OF THE INVENTION

In a broad aspect, the present invention relates to a method and apparatus for restricting data access in a secure system. In an embodiment of the invention one of a plurality of initiators on a first bus requests data access from one of a plurality of data sources and destinations on a second bus by transmitting a data access command from the initiator to the data source or destination. The data access command contains an identification of the initiator from which the data access command originated and an identification of the data source or destination being accessed.

A filter is provided which is arranged to selectively block or allow each data access command according to whether the initiator from which a data access command originated is secure or insecure and whether the data source or destination being accessed is privileged or unprivileged. The security filter compares the initiator identification and data source or destination identification contained within the data access command with a list of those initiators defined as secure and a list of those data sources or destinations which are defined as unprivileged. The filter then blocks or allows the data access command signal according to a set of rules.

In one embodiment, the most secure initiator is a security control circuit which is authorized to access all data sources or destinations. The other secure initiators are authorized to access only specified unprivileged data sources or destinations and the insecure initiators are not authorized to access any data sources or destinations.

The information relating to which initiators are secure and insecure and which data sources or destinations are privileged and unprivileged is loaded during an initialization procedure by the security control circuit in response to a configuration command transmitted by a processor. In order that the configuration command is not blocked by the security filter before the processor is authorized to access the security control circuit prior to initialization, the configuration command is verified using a signature check. If the signature check is passed, the configuration command is allowed.

DETAILED DESCRIPTION OF THE INVENTION

A wide variety of techniques for broadcast transmission are known in which the broadcast signal is encoded, scrambled or encrypted in some way to allow only authorized recipients to retrieve the original signal. One particular field in which this area has been researched is broadcast television.

The broadcast of television signals in which only permitted or authorized recipients can produce the clear television picture from those signals is known as Conditional Access Television or Pay-Television. In this context, broadcast can include over-air, via satellite, by cable or indeed any appropriate distribution medium in which the same signal content is sent to many recipients. Television signals may be analog signals or digital signals. The term "scrambling" is often used for the process of rendering analog signals unusable until "descrambled", whereas the terms "encryption" and "decryption" are more often used for digital signals. In either case, the aim is to only allow users that have paid a subscription to descramble/decrypt the signals.

Figure 1:
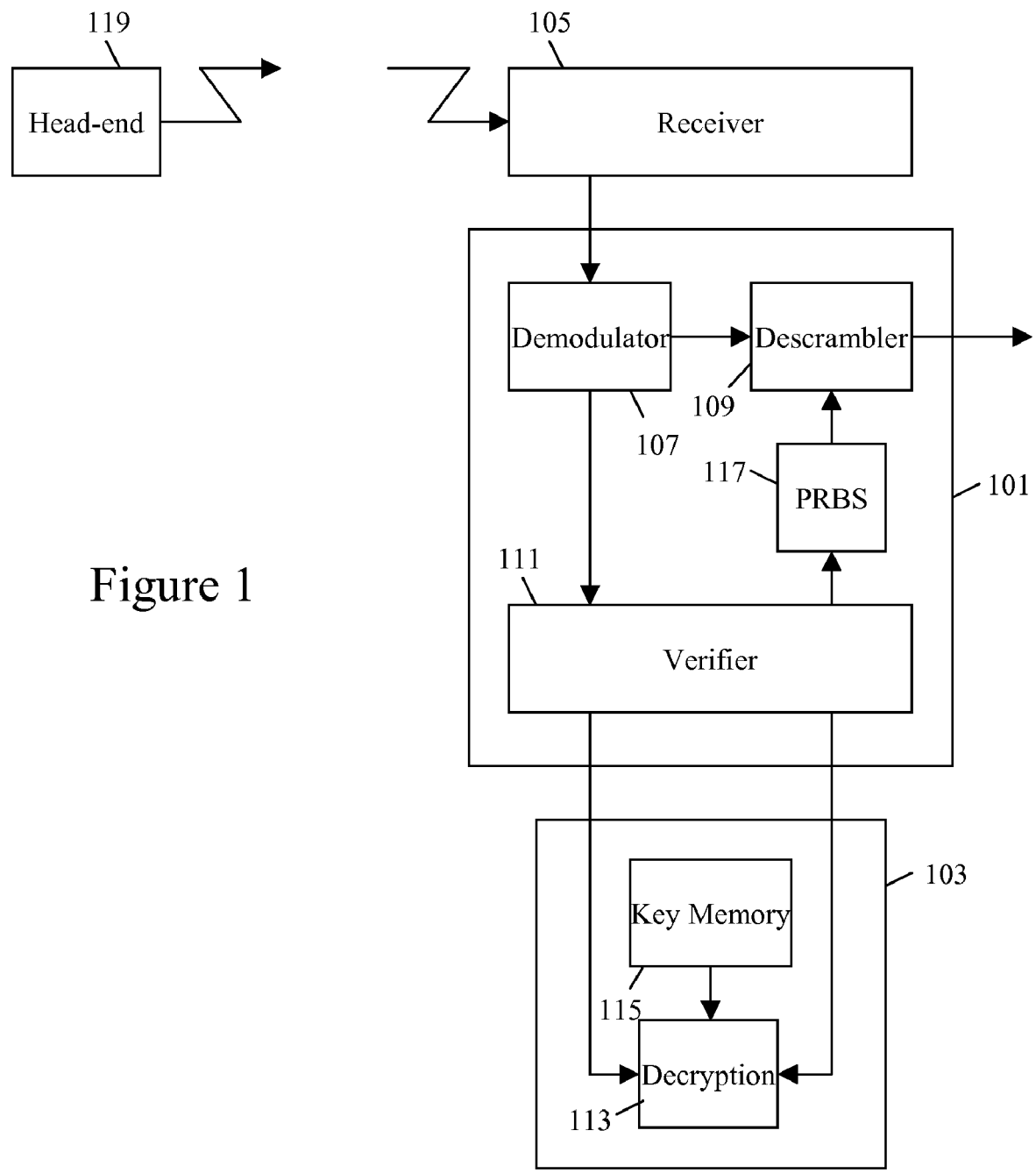
FIG. 1 is a schematic diagram of a pay-television system.

A system and receiver for processing received signals in which the present invention may be employed is illustrated in FIG. 1. The concept in this system is to broadcast signals in the air (by satellite) which can be received by anyone, but only rendered usable by recipients having a "set top box" or television decoder 101 and an associated smart card 103. The decoders 101 of all recipients are identical, but the smart cards 103 contain unique secrets, including entitlements, which specify which channels or programs within the broadcast signals the user is permitted to watch. The entitlements may be in the form of cryptographic keys, each associated with an individual channel or program. The system operates broadly as follows:

A television signal is broadcast over air in a scrambled form and includes a stream of control data describing how the television signal is to be descrambled. The broadcast signals originate from a head-end 119 which scrambles the television signals and broadcasts these together with the control data.

The television signals and control data for a particular broadcast are necessarily the same signal sent to all users. It is not feasible to send the signals uniquely scrambled/encrypted to each recipient as there may be tens of millions of users and this would require tens of millions of times the bandwidth. Accordingly, all recipients typically operate the same descrambling/decryption process. This is implemented in the decoder 101 which receives the broadcast signals from a receiver 105. A data demodulator 107 extracts the portion of the signal for picture and/or sound and provides this to a descrambler 109 for descrambling. The control data portion is extracted and provided to a verifier 111. The control data comprises encrypted control words that instruct the descrambler 109 how to descramble the picture/sound signal. The control words that descramble the signals associated with a particular channel or program are encrypted using a unique cryptographic key associated with that channel or program. The control words are therefore decrypted, and it is for this purpose that the smart card 103 is provided.

The verifier 111 provides encrypted control words across an interface to the smart card 103. The smart card 103 comprises a decryption circuit 113 which receives the encrypted control words which are decrypted according to an algorithm using a cryptographic key retrieved from a key memory 115 in the smart card 103. If the user is entitled to watch the chosen channel or program, the smart card 103 will contain the appropriate cryptographic key associated with that channel or program allowing the corresponding control words to be properly decrypted. The decrypted control words are provided to the verifier 111. The verifier 111 passes the decrypted control words to a pseudo-random binary sequence generator (PRBS) 117 which in turn provides a descrambling code to the descrambler 109. It should be noted that the control words and hence the descrambling code change frequently (every few seconds). The security in this arrangement is thus that it is not feasible to try and decrypt the control words in real time without the smart card algorithm. Also, in the event that the smart card algorithm is compromised, then the smart cards themselves can be re-issued to all subscribers. Lastly, to view any channels or programs, a user must pay for "entitlements" which are broadcast over air addressed uniquely to each user and stored in the smart card 103.

In other systems, the components on the smart card 103 such as the key memory 115 and the decryption circuit 113 are incorporated into the decoder 101, thereby eliminating the need for a separate smart card 103.

Figure 2:
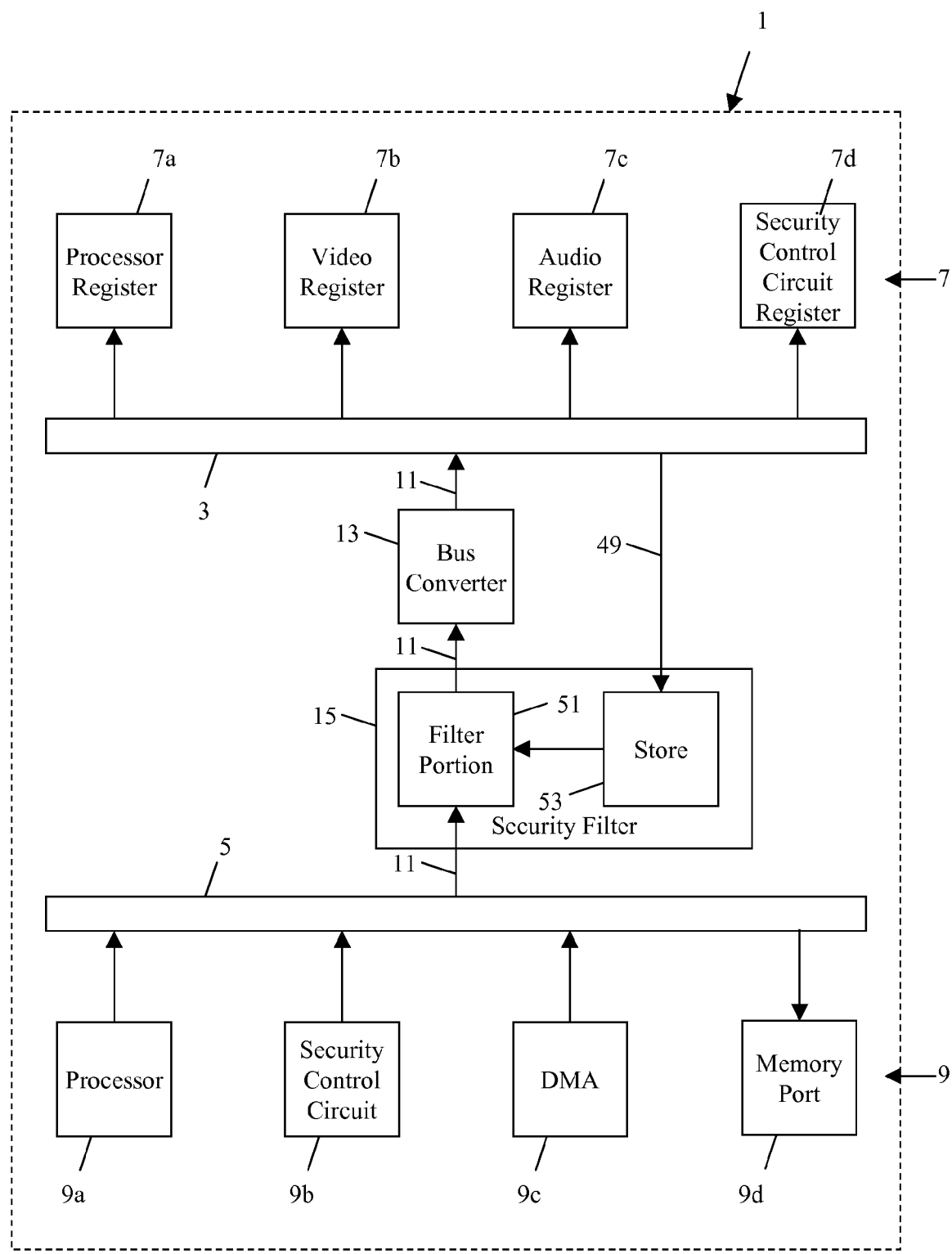
FIG. 2 is a schematic diagram of a system according to one embodiment of the invention.

One exemplary embodiment of the present invention is shown in FIG. 2. In this embodiment, the invention is utilized within a set-top-box pay-television system in which subscribers make a payment to a broadcast service provider in exchange for receiving broadcast services. The set-top-box comprises one or more stores or memories for storing various data such as cryptographic keys, encrypted and decrypted broadcast data and software for performing various functions including the cryptographic functions necessary to maintain the security of the system. The set-top-box also comprises a cryptographic circuit for executing various cryptographic algorithms, a security control circuit for controlling the security features of the set-top-box and a central processor for controlling various other functions of the set-top-box. The set-top-box further comprises a broadcast receiver for receiving encrypted broadcast data, and an output for outputting decrypted television signals to a television set.

In such a system, broadcast signals are received by the receiver in an encrypted form which are then decoded, demultiplexed and stored in a buffer. The encrypted television signals extracted from the broadcast signals are passed to the cryptographic circuit where they are decrypted under the control of the security control circuit using one or more decryption keys stored in the set-top-box and control words extracted from the broadcast signals. The decrypted television signals are then stored in a further buffer where they may be transmitted to an output of the set-top-box connected to a television set.

The system 1 illustrated in FIG. 2 comprises a first data bus 3 and a second data bus 5. Connected to the first bus 3, which may be for example a low bandwidth bus, are one or more data sources and/or destinations 7a, 7b, 7c, 7d. In the embodiments described below, the data sources and destinations 7a, 7b, 7c, 7d are stores for storing configuration data. For example, the data sources and destinations 7a, 7b, 7c, 7d may be configuration registers which store relatively small amounts of configuration data. For example, data source and destination 7a is a processor configuration register which stores certain operation parameters used by the processor. Data sources 7b and 7c are configuration registers associated respectively with video and audio data streams. These registers store for example data including the memory addresses of the locations to which video and audio data are to be written such as the video and audio buffers. Data source and destination 7d is a configuration register of a security control circuit arranged to perform various processes that maintain the security of the system 1. A further data source and destination 53 which forms part of a security filter 15 is connected to the first bus 3. Any other alternative or additional data sources and/or destinations may be connected to the first bus 3. During use of the system 1, data is transmitted to or from the data sources and destinations 7 via the first bus 3.

Connected to the second bus 5, which may be for example a high bandwidth bus, are one or more initiators 9a, 9b, 9c. An initiator is a device which may request data access to or from a data source or destination 7. For example, the initiators 9 may include a processor 9a, a security control circuit 9b and a direct memory access (DMA) device 9c which may each request data access to or from one or more of the data sources and destinations 7. Also connected to the second bus 5 may be one or more further data sources or destinations such as memory port 9d which is connected to the main memory block of the system. The memory port 9d may provide access for example to the video and audio buffers and other external memories. The memory port 9d is connected to the high bandwidth second bus 5 since relatively large quantities of data may be required to be stored in or retrieved from the main memory of the system. One embodiment of the present invention is provided to protect the configuration registers from illegitimate access. In the case where access to a data source or destination is provided on the second data bus 5 access to this data source or destination should preferably be restricted by any suitable means.

An initiator 9 requests data access to or from the data sources or destinations 7a, 7b, 7c, 7d by generating a data access command which contains an identification of the initiator 9 requesting the data access, an indication of the data source or destination 7a, 7b, 7c, 7d required to be accessed. The data access command may contain any further relevant information such as an indication of whether the data access is a read or write request. The initiator identification may be for example a number which is unique to the initiator 9 such as the IP address of the initiator 9. For convenience, the memory regions of each data source and destination 7 may be considered to map onto a single virtual memory space. The regions of memory corresponding to each data source or destination 7 occupy particular mutually exclusive regions of the virtual memory space. A region of memory corresponding to a particular data source or destination may then be specified in the data access command as a memory address or region of memory in the virtual memory space. References below to particular regions of the virtual memory space should be taken as corresponding to particular data sources or destinations.

The data access command is received by the appropriate data source or destination 7 which then retrieves or stores data according to the data access command. For example, in the case that the data access was a write request to the video configuration register 7b, the data access command causes the memory address of the video buffer to be written to the video configuration register. This memory address is then be used by the video block when writing video data so that the data is written to the appropriate location via the memory port 9d on the second bus 5. Although the video buffer is connected via the second data bus so that access to video data is not directly restricted, one embodiment of the present invention does provide indirect protection. For example, in order to access video data, a hacker may attempt to write a memory address to the video configuration register corresponding to a memory which is more accessible to the hacker than the video buffer, such as an unprotected external memory. In this way, the video data would be written by the video block to the vulnerable memory location where the hacker could easily access the data rather than to the more secure video buffer. By restricting access to the video configuration register the embodiment prevents this attack on the system.

The first bus 3 may be regarded as a configuration bus from which configuration data stored in the configuration registers 7a, 7b, 7c 7d may be accessed. Some of the configuration data may be used by the initiators 9a, 9b, 9c, for example, to read or write data at a high bandwidth from or to various memory locations via the second bus 5 and memory port 9d.

A single device may function as both an initiator 9 and a data source or destination 7. For example, the processor 7a and security control circuit 7d each have functions which allow them to both store data (such as configuration data in a configuration register) and to request data access from other sources and destinations. In FIG. 2, those devices which are both initiators 9 and data sources or destinations 7 are represented as two blocks, one of which corresponds to the part of the device which is an initiator 9 and the other which corresponds to the part of the device which is a data source or destination 7. The skilled person will appreciate that FIG. 2 is schematic in nature rather than representing the physical layout of the system, and that, for example, the blocks 7a and 9a represent parts of the same physical device.

The first bus 3 and the second bus 5 are connected together by a data pathway 11 so that data access commands and other signals may be transmitted from the initiators 9 to the data sources and destinations 7. As mentioned above, the first bus 3 may be of a different type to the second bus 5 so that the particular data formats and transmission protocols that are suitable for the first bus 3 are not compatible with the second bus 5. Therefore, a bus converter 13 is provided on the data pathway 11 which is arranged to intercept any data access commands passing along the data pathway 13 from the second bus 5 to the first bus 3 and to convert the data access command from the format suitable for the second bus 5 to a format suitable for the first bus 3. As part of this conversion process, the initiator identification part of the data access command indicating the origin of the data access command may be lost.

In a secure system such as a set-top-box in a pay television system, some of the data within the system may be sensitive data which needs to be protected from unauthorized access. For example, data in the form of television broadcast data may be sensitive because access to such data should be restricted to those persons who have made the appropriate payment to the broadcast service provider. Data in the form of cryptographic keys may also be sensitive because the security of the system relies on these keys being secret. Data in the form of configuration data stored in a configuration register which is used to access sensitive data may also be regarded as sensitive. For example, if access to a particular video stream needs to be restricted so that the video data is sensitive, the configuration data required to access the video stream is also sensitive. A data source or destination 7 in which sensitive data is stored or from which sensitive data is output may be referred to as a privileged data source or destination 7.

Conversely, a data source or destination 7 in which non-sensitive data is stored may be referred to as an unprivileged data source or destination 7. A single data source or destination 7 may have both a privileged region and an unprivileged region of memory. In some embodiments, different pieces of data may each be sensitive in the sense that they need to be kept secret, but some of the pieces of data may be more sensitive than other pieces. In this case, a data source or destination 7 may be assigned a privilege level indicating the sensitivity of the data stored. For example, an unprivileged data source or destination 7 may be assigned a privilege level of zero and a data source or destination 7 storing secret decryption keys may be assigned the highest privilege level, while each other data source or destination 7 is assigned a privilege level in between.

In order to illegitimately access sensitive data a person may attempt to tamper with the system in a process known as hacking. For example, a hacker may attempt to replace components within the system, reroute data or feed illegitimate instructions into the system. Some parts of the system including the initiators 9 may be more vulnerable to hacking than others. For example, it is more difficult for a hacker to replace those parts of the system which are part of a monolithic device such as an internal processor. Also, some parts of the system such as the security control circuit 9c are protected by various security features involving cryptographic processes and data checking. An initiator 9 which is prone to hacking may be referred to as being insecure while an initiator 9 which is not prone to hacking may be referred to as being secure.

In an extension to this terminology, an initiator 9 may be referred to as being secure with respect to one or more data sources or destinations 7 and insecure with respect to the others. An initiator 9 may be said to be secure with respect to a particular data source or destination 7 if that initiator 9 is entitled to access data to or from that data source or destination 7. For example, an initiator 9 may be secure because the initiator 9 is protected by a particular security feature. However, the reliability of the security feature may be limited to an extent that the initiator 9 should only be allowed to access data sources or destinations 7 having a privilege level below a particular threshold. In this case, the initiator 9 may be said to be secure with respect to those data sources or destinations having a privilege level below the threshold. One purpose of allowing an initiator 9 to be secure with respect to one data source or destination 7 but not another is to provide for robust partitioning between data sources and destinations 7. For example, it may be desirable that one initiator 9 which is entitled to access one data source or destination 7 is not entitled to access another data source or destination 7. This entitlement may be indicated by specifying that the initiator is secure only with respect to the data sources or destinations 7 it is entitled to access.

In order to maintain the security of the system, it is desirable to prevent data access to or from privileged data sources or destinations 7 by initiators 9 which are insecure with respect to those data sources or destinations 7. In general, it is desirable to securely control which initiators 9 are allowed to access which data sources and destinations 7. Since the information relating to the origin of the data access commands is lost when the signals are converted to a format suitable for the first bus 3, it is not possible for a data source or destination 7 to determine if a data access request has originated from a secure or insecure (with respect to that data source or destination) initiator 9. According to the present invention, the security of the system is maintained by providing a security filter 15 on the data pathway 11 which selectively blocks or allows data access commands according to whether the initiator 9 which generated the data access command is secure or insecure and on whether the memory address being accesses is privileged or unprivileged. The security filter 15 is located on the data pathway 11 between the second bus 5 and the bus converter 13 so that the security filter 15 receives the data access commands before the information relating to the origin of each data access command is lost.

In order to selectively block or allow data access commands, the security filter 15 stores information relating to which initiators 9 are secure and stores further information relating to which regions of the virtual memory space (corresponding to the memory regions of the data sources and destinations 7) are unprivileged. When the security filter 15 receives a data access command, the security filter 15 uses the information contained within the data access command to determine which initiator 9 generated the data access command and which region of the virtual memory space contains the data being requested by that initiator 9. The security filter 15 then allows or blocks the data access command according to a set of rules which specify which initiators 9 are allowed to access which data sources and destinations 7. If the data access command is allowed then the security filter 15 allows the data access command to be transmitted to the first bus 3 and to the appropriate data source or destination 7. If the data access command is blocked, a system reset may be performed.

Figure 3:
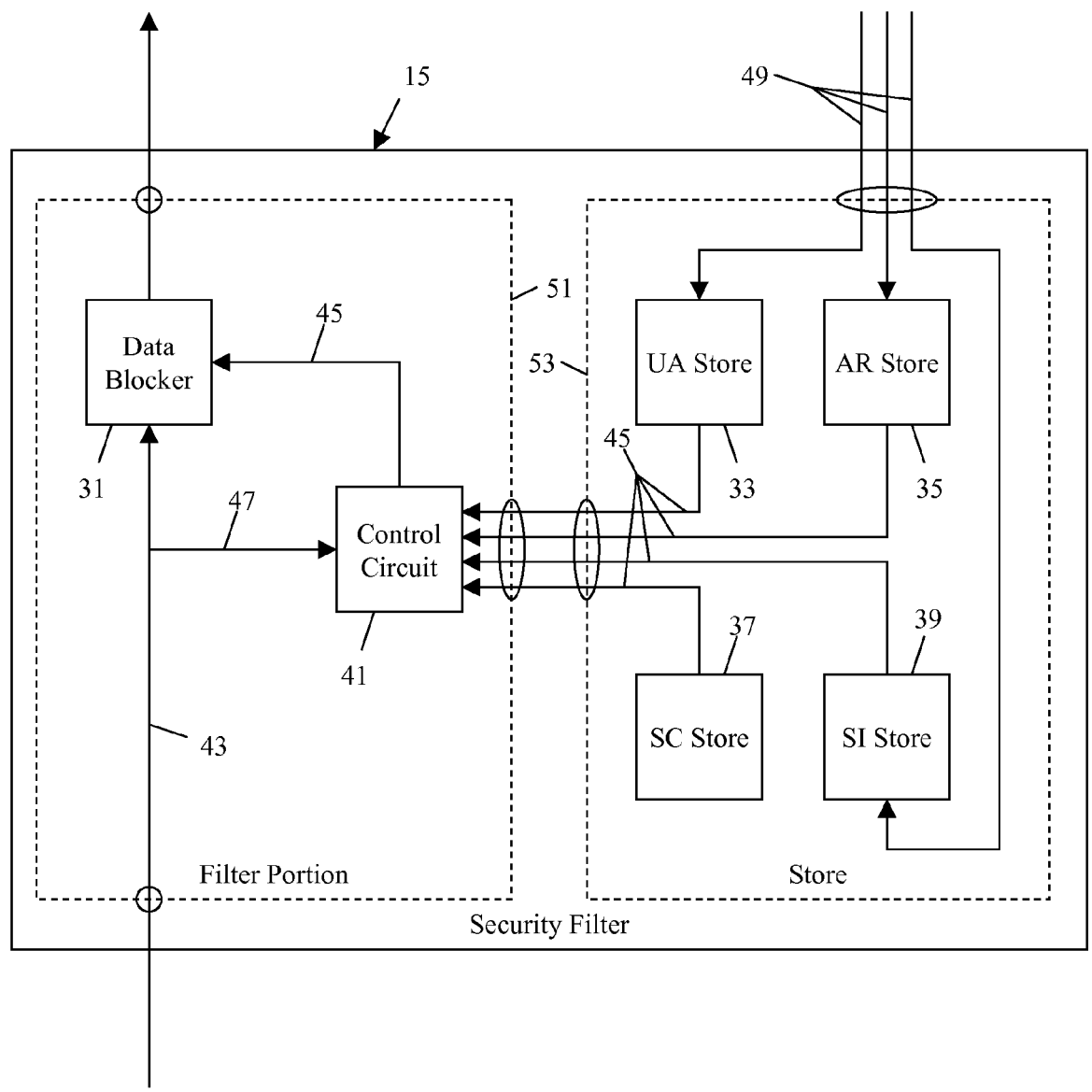
FIG. 3 is a schematic diagram of the security filter shown in FIG. 2.

FIG. 3 is a schematic diagram of the security filter 15 shown in FIG. 2. The security filter 15 comprises a filter portion 51 and a store portion 53. The filter portion 51 comprises a data blocker 31 arranged to block or allow data access commands passing through the filter 15 and a control circuit 41. The store portion 53 comprises four data stores 33, 35, 37, 39 for storing information relating to the initiators 9 and the data sources and destinations 7. The data stores 33, 35, 39 of the store portion 53 are data sources and destinations connected to the first bus 3 via a data pathway 49.

A data access command received by the security filter 15 is transmitted along a data pathway 43 and received by the data blocker 31. The data blocker 31 also receives an authorization signal received from the control circuit 41 along a data pathway 45. The data blocker 31 is arranged to selectively block or allow the data access command according to the authorization signal. For example, if the authorization signal is asserted then the data blocker 31 allows the data access command, in which case the data access command is transmitted from the data blocker 31 to an output of the security filter 15. If the authorization signal is not asserted then the data blocker 31 blocks the data access command, in which case a signal is transmitted from the security filter 15 which causes a system reset. Alternatively, an error message may be issued.

The four data stores 33, 35, 37, 39 are used to store information relating to which initiators 9 are secure and which regions of the virtual memory space (each region corresponding to a data source or destination 7) are unprivileged. The control circuit 41 receives this information via a series of data pathways 45 and uses it together with information contained in the data access command to determine whether or not to assert an authorization signal to cause the data blocker 31 to either allow or block the data access command. The process by which the contents of the data stores 33, 35, 37, 39 are programmed is described in greater detail below.

A first store 39, referred to as the secure initiator (SI) store stores an indication of which initiators 9 are secure. In the case where initiators may be secure with respect to particular data sources or destinations 7 the SI store 39 stores an indication of all those initiators 9 which are secure with respect to any of the data sources or destinations 7. For example, the SI store 39 may store a list of the initiator identifications of those initiators 9 which are secure. The SI store 39 may be, for example, a re-writable memory such as a RAM arranged so that the contents can be modified. An initiator 9 is defined as secure by virtue of its identification being stored in the SI store 39 and when an initiator 9 is defined as secure, this affects its authority to access certain data sources and destinations 7. An initiator 9 may be secure only once a particular security feature is activated or once a particular security check has been made. It would then be desirable to change the status of a particular initiator from insecure to secure, or vice versa, by modifying the contents of the SI store depending on whether the security feature is activated or whether the security check has been performed.

In the illustrated embodiment, the security control circuit 9c is the component which controls all of the security features of the system and is the most secure and trusted initiator. The security of the security control circuit 9c may be maintained for example because every instruction generated by the security control circuit 9c is verified, for example using an instruction signature checking process. Unlike other secure initiators 9, the security control circuit 9c is considered to be secure by default at all times and with respect to all data sources and destinations 7 since if the security control circuit 9c were insecure then the security of the system would be compromised. For this reason, the identification of the security control circuit 9c is stored in a second data store 37, referred to as the security control (SC) store in a permanent manner. The SC store 37 may be, for example, a ROM or one-time-programmable memory.

When a data access command is received by the security filter 15, the control circuit 41 determines whether the initiator 9 which generated the data access command is the security control circuit 9c, another secure initiator 9 or an insecure initiator 9. The control circuit 41 receives the data access command via a data pathway 47 connected to the data pathway 43 and extracts the initiator identification contained in the data access command. The control circuit 41 then compares the extracted initiator identification with the initiator identifications stored in the SI store 39 and the SC store 37. If the extracted initiator identification is the same as the initiator identification stored in the SC store 37 then the control circuit 41 determines that the data access command was generated by the security control circuit 9c. If the extracted initiator identification is not the same as the initiator identification stored in the SC store 37, but is the same as one of the initiator identifications stored in the SI store 39, then the control circuit 41 determines that the data access command was not generated by the security control circuit 9c but was generated by another secure initiator 9. If the extracted initiator identification is not the same as the initiator identification stored in the SC store 37 and different from all of the initiator identifications stored in the SI store 39 then the control circuit 41 determines that the data access command was generated by an insecure initiator 9.

A third data store 33, referred to as the unprivileged address (UA) store, stores an indication of which regions of the virtual memory space (corresponding to the data sources and destinations 7) are unprivileged. In one embodiment, the UA store 33 comprises a table containing pairs of entries, each pair corresponding to the start and end memory addresses of an unprivileged region of the virtual memory space. Since the virtual memory space corresponds to the real memory spaces of the data sources and destinations 7, defining a region of the virtual memory space as unprivileged is equivalent to defining a region of the real memory space of a data source or destination 7 as unprivileged. The unprivileged real memory space may be the entire memory space of a data source or destination 7 or a portion of the memory space of a data source or destination 7.

The entries in the UA store 33 may be thought of as defining 'holes' in the virtual memory space corresponding to data sources or destinations 7 involving non-sensitive data. The UA store 33 may be, for example, a re-writeable memory such as a RAM arranged so that the contents can be modified. A region of the virtual memory space is defined as unprivileged by virtue of a pair of entries corresponding to the region being stored in the SI store 33. When a region of the virtual memory space is defined as unprivileged this affects the access that some initiators have to that region.

When the security filter 15 receives a data access command generated by an initiator 9, the control circuit 41 determines whether the memory address the initiator 9 is attempting to access is privileged or unprivileged. The control circuit 41 receives the data access command via the data pathway 47 and extracts the memory address contained in the data access command. The control circuit 41 then determines whether the extracted memory address falls within any of the unprivileged regions of the virtual memory space, as defined by the entries in the UA store 33. If the extracted memory address falls between any of the pairs of start and end memory addresses stored in the UA store 33 then the control circuit 41 determines that the extracted memory address is unprivileged. If the data access command specifies a region of memory the initiator 9 is attempting to access, the control circuit 41 determines whether the specified region falls between any of the pairs of start and end memory addresses stored in the UA store.

A fourth store 35, referred to as the access rights (AR) store stores information indicating which initiators 9 can access each unprivileged region of the virtual memory space. For example, for each pair of start and end memory addresses stored in the UA store 33, the AR store 35 stores an associated list identifying one or more initiators 9 that are entitled to access each corresponding unprivileged region of the virtual memory space. In the case where initiators 9 may be secure with respect to particular data sources or destinations 7 the AR store 35 provides an indication of which initiators 9 are secure with respect to each unprivileged region of the virtual memory space identified in the UA store 33 In one embodiment, the AR store 35 stores the initiator identifications. In another embodiment, the AR store 35 stores references to entries in the SI store 39, so that, for example, the AR store 35 may specify that the initiators 9 specified in the second and third entries of the SI store 39 are entitled to access a particular unprivileged region of the virtual memory space.

As mentioned above, when a data access command is received by the security filter 15 the security filter 15 allows or blocks the data access command according to a set of rules which specify which initiators 9 are allowed to access which data sources and destinations 7. In a first embodiment the security control circuit 9*c* is entitled to access all of the data sources and destinations 7. In other words, the security control circuit 9*c* is considered to be secure with respect to all regions of the virtual memory space. Accordingly, if the control circuit 41 determines, in the process described above, that the data access command was generated by the security control circuit 9*c* then the control circuit 41 asserts the authorization signal, causing the data blocker 31 to allow the data access command, regardless of which region of the virtual memory address the initiator 9 is attempting to access.

In this embodiment the other secure initiators 9, as defined by the contents of the SI store, are not entitled to access the privileged data sources and destinations. In other words, the initiators 9 identified in the SI store 39 are insecure with respect to all of the privileged regions of the virtual memory. Accordingly, if the control circuit 41 determines that the data access command was not generated by the security control circuit 9*c* and that the memory address an initiator is attempting to access does not correspond to an unprivileged data source or destination then the control circuit 41 does not assert the authorization signal, causing the data blocker 31 to block the data access command.

In this embodiment, only secure initiators 9 are entitled to access the unprivileged data sources and destinations. Furthermore, for a particular region of the virtual memory space an initiator 9 is attempting to access, only those initiators 9 specified in the AR store 35 are entitled to access that region. In other words, the other secure initiators 9 are secure only with respect to certain specified unprivileged regions of the virtual memory space. Accordingly, if the control circuit 41 determines that the memory address an initiator 9 is attempting to access specified in the data access command corresponds to a unprivileged region of the virtual memory space, the control circuit 41 determines from the contents of the AR store 35 which initiators 9 are entitled to access that region. Then, the control circuit 41 determines whether the initiator 9 that generated the data access command is one of the initiators 9 entitled to access the region of the virtual memory space being accessed. If it is, then the authorization signal is asserted otherwise the authorization signal is not asserted.

In this embodiment the insecure initiators 9 are not entitled to access any of the data sources and destinations 7. Accordingly, if the control circuit 41 determines that the data access command was generated by an insecure initiator 9, the control circuit 41 does not assert the authorization signal, regardless of which region of the virtual memory space the initiator 9 is attempting to access.

It is understood that the control circuit 41 may cause data access commands to be blocked or allowed according to any suitable alternative set of rules. For example, in another embodiment the security control circuit 9*c* is entitled to access all of the data sources and destinations 7, secure initiators 9 are entitled to access the unprivileged data sources and destinations 7 and selected ones of the privileged data sources and destinations 7, and insecure initiators 9 are entitled to access only the unprivileged data sources and destinations 7.

In further embodiments, whether a data access command is blocked or not may depend on whether the data access request is a data read or data write request. For example, the above rules may apply when the data access is a read request. However, when the data access is a write request, all data access commands are allowed, regardless of which initiator 9 requested the data access and which data source or destination 7 is being accessed. In one embodiment, the access to the data sources and destinations 7 by the security control circuit 9c is restricted to data write access. In this case, if the security filter 15 determines that a data access command has originated from the security control circuit 9c and that the data access command represents a data read then the data access command is blocked.

It is understood that the above rules and other alternative rules may be used in any suitable combination. In one embodiment, the security control circuit 9c is arranged to configure the control circuit 41 to select which data access rules are used.

The information stored in the SI, UA and AR stores 39, 33, 35 is loaded during a system initialization procedure in which the initiator part of the security control circuit 9c requests transmission of the necessary data via a series of data pathways 49 to the stores 39, 33, 35. The security control circuit 9c may also modify the contents of the SI, UA and AR stores 39, 33, 35 during use of the system. Since the security of the system depends on the contents of the SI, UA and AR stores 39, 33, 35, it is important that only a trusted and legitimate source such as the cryptographic circuit 9c is allowed to modify the contents of these stores. The security control circuit 9c is able to cause data to be stored in the SI, UA, and AR stores 39, 33, 35 without the data access command being blocked by the security filter 15 by virtue of the initiator identification of the security control circuit 9 being stored in the SC store 37.

In order to load the appropriate data into the SI, UA and AR stores 39, 33, 35, the security control circuit 9c needs to be properly configured. The security control circuit 9c is configuration by means of a configuration message which provides the security control circuit 9c with the appropriate configuration data necessary to perform the task of loading the data into the stores 39, 33, 35. The configuration message is generated by the initiator part of the processor 9a on the second bus 5 and transmitted to the configuration register of the security control circuit 7d on the first bus 3. However, at this stage, since no data has yet been loaded into the SI store 39, the processor 9a is not defined as being secure and so is not entitled to access the security control circuit configuration register 7d.

In order to prevent the configuration message from being blocked a process is carried out in which the validity of the configuration message is checked by the security filter 15 to ensure that the configuration message is genuine and has originated from a trusted source. If the configuration message does not pass this validity check the security filter 15 blocks it. In one embodiment, the configuration message is transmitted together with an associated signature which may be used to verify the authenticity of the configuration message. The signature may be for example an encrypted hash value of the configuration message. The hash value may be produced using any suitable hash function such as the secure hash standard algorithm SHA-1. The hash value may be encrypted for example using any suitable cryptographic algorithm such as the RSA asymmetric cryptographic transform in which the hash value may be encrypted using an encryption key and decrypted using an associated decryption key. The signature may be stored in a permanent manner in a secure internal memory in the system, for example at the manufacturing stage, or may be generated when needed by the security control circuit.

When the configuration message is transmitted, it is intercepted by the security filter 15 which checks the validity of the configuration message using the signature. The signature is first decrypted using the appropriate decryption key to obtain a first hash value. Then, a second hash value is produced by the security filter 15 by hashing the configuration message. If the security filter determines that the first and second hash values are identical then the signature may be considered to be valid and the configuration message may be considered to be authentic. It is important to maintain the security of the system that the encryption key used to produce the valid signature is kept secret. A hacker would not be able to produce the correct signature for an illegitimate configuration message since the encryption key needed to produce the signature is secret. If the wrong key were used then when the signature is decrypted, the wrong hash value would be produced. If the wrong signature is used then the configuration message would be blocked.

It can be seen that the overall security of the system is maintained by a chain of process steps in which the security of each step is ensured by the security of the preceding steps. The security of the initial step is ensured by means of a security verification process. The initial step comprises a signature check of the configuration message which ensures that only authorized configuration messages are allowed to configure the security control circuit 9c. After configuration, the data accesses initiated by the security control circuit 9c are allowed by virtue of the identification of the security control circuit 9c stored in the SC store 37. This in turn allows the security control circuit 9c to load data into the SI, UA and AR stores 39, 33, 35. Since the security control circuit 9c was configured with an authorized configuration message, the data loaded into the SI, UA and AR stores 39, 33, 35 can be regarded as legitimate. Finally, the data loaded into the SI, UA and AR stores 39, 33, 35 allows conditional data access by the initiators 9. Since the data loaded in the SI, UA and AR stores 39, 33, 35 is legitimate, this ensures that undesirable data accesses are prevented.

One advantage is that the data defining the data access rules, or defining which data accesses are allowed, is stored in one or more of the data source or destinations, access to which are subject to the data access rules. For example, in the embodiments described above the data defining the rules was stored in the store portion of the security filter. This means that any data access attempting to modify the data defining the rules, or defining which data accesses are allowed (for example to try to access data illegitimately) must itself satisfy the existing rules, thus increasing the difficulty of illegitimate data access.

In the embodiments described above the SI and SC stores 39, 37 store an indication of which initiators 9 are secure. However, it is understood that the SI and SC stores 39, 37 may instead store an indication of which initiators are insecure. What is important is that the control circuit 41 can determine whether a data access command has originated from a secure or insecure initiator. Similarly, in the embodiments described above the UA store 33 stores an indication of which memory addresses, and therefore which data sources and destinations 7, are unprivileged. It is understood that the UA store 33 may instead store an indication of which memory addresses, and therefore which data sources and destinations 7, are privileged. What is important is that the control circuit 41 can determine whether a data access command is attempting to access a privileged or unprivileged data source or destination 7.

In the embodiments described above data access was blocked or allowed according to whether the initiator 9 requesting the data access was secure or insecure and whether the data source or destination 7 was privileged or unprivileged. However, it is understood that the present invention may be used to selectively allow or block data accesses according to other conditions. In general the present invention may be used to control which initiators 9 can access data from which data sources or destinations 7. Which data accesses are allowed and which are not are defined by a series of rules. When a data access is attempted, the control circuit 41 determines whether or not a data access rule has been satisfied or broken and allows or blocks the data access accordingly.

Preferably, the security filter 15 is part of a monolithic device such as a monolithic semiconductor integrated circuit to prevent hackers from replacing components in the system or from feeding illegitimate data into the system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for restricting access to data within a system, the system including one or more initiator devices and one or more data sources or destinations, in which a respective one of the one or more initiator devices requests data access from or to a respective one of the one or more data sources or destinations by transmitting a data access command to the respective data source or destination, the semiconductor integrated circuit comprising:
 a store portion arranged to include at least one of the one or more data sources or destinations, and arranged to store information identifying the one or more initiator devices and the one or more data sources or destinations, the store portion including a first store arranged to store a list of identifications of initiator devices that are secure;
 a control circuit arranged to receive the data access command transmitted from the initiator device to the respective data source or destination and to generate an authorization signal according to whether or not the data access command satisfies one or more data access rules, the data access command including an initiator identification identifying the respective initiator device and a data identification identifying the respective data source or destination that the respective initiator device is attempting to access;
 a data blocker arranged to selectively block or allow the data access command in response to the authorization signal; and
 a security control circuit arranged to cause data to be loaded into the first store during an initialization procedure in response to a configuration message, and arranged to verify the authenticity of the configuration message and to block the configuration message if the configuration message is determined to be not authentic,
 wherein the one or more data access rules depends on at least one comparison between the initiator identification and/or data identification comprised in the data access command and the information stored in the store portion.

2. A semiconductor integrated circuit according to claim 1 in which the data access rules include at least one rule which depends on whether the initiator device which generated the data access command is secure or insecure.

3. A semiconductor integrated circuit according to claim 1 in which at least one data access rule depends on whether data access is a read or write operation.

4. A semiconductor integrated circuit according to claim 1 in which the data access rules include at least one rule which depends on whether the data source or destination being accessed is privileged or unprivileged.

5. A semiconductor integrated circuit according to claim 1 in which the data access rules include at least one rule which depends on whether the initiator device which generated the data access command is positively entitled to access the data source or destination being accessed.

6. A semiconductor integrated circuit according to claim 1 in which the one or more initiator devices include an initiator device specified in a second store is part of a security control circuit and in which one of the data access rules specifies that the data source or destination corresponding to the store portion may only be accessed by the security control circuit.

7. A semiconductor integrated circuit according to claim 1 in which the system further comprises a signal converter for converting a format of data access commands passing from the initiator devices on a first data bus to the data sources and destinations on a second data bus, and in which the semiconductor integrated circuit is located between the first data bus and the signal converter.

8. A semiconductor integrated circuit according to claim 1 in which at least one of the data sources or destinations is accessed via a configuration bus, and in which the data blocker is placed between the configuration bus and the initiator devices.

9. A semiconductor integrated circuit according to claim 1 in which the semiconductor integrated circuit is part of a monolithic circuit.

10. The semiconductor integrated circuit of claim 1 wherein the one or more initiator devices include one or more of a processor, the security control circuit, and a direct memory access device.

11. A semiconductor integrated circuit according to claim 2 in which one of the data access rules specifies that all data access commands transmitted by insecure initiator devices are blocked by the data blocker.

12. A semiconductor integrated circuit according to claim 2 in which the control circuit is arranged to determine that the initiator device which generated the data access command is secure if the initiator identification comprised in the data access command corresponds to one of the identifications stored in the first store.

13. A semiconductor integrated circuit according to claim 2 in which the first store is configured to store the list of identifications in a permanent manner.

14. A semiconductor integrated circuit according to claim 3 in which the first store is configured to store the list of identifications in a permanent manner and one of the data access rules specifies that if the data access command was generated by one of the initiator devices specified in the store the data access command is only allowed by the data blocker if the data access command corresponds to a data write operation.

15. A semiconductor integrated circuit according to claim 4 in which one of the data access rules specifies that a data access command transmitted by a secure initiator device and which is attempting to access a privileged data source or destination is blocked by the data blocker.

16. A semiconductor integrated circuit according to claim 4 in which the store portion further comprises a second store for storing an indication of which data sources or destinations are unprivileged, and in which the control circuit is arranged to determine that the data source or destination being accessed is unprivileged if the data identification corresponds to one of the data sources or destinations identified in the second store.

17. A semiconductor integrated circuit according to claim 5 in which one of the data access rules specifies that a data access command transmitted by a secure initiator device and which is attempting to access an unprivileged data source or destination is allowed by the data blocker if the initiator device attempting the data access is positively entitled to access the data source or destination.

18. A semiconductor integrated circuit according to claim 5 in which the store portion further comprises a second store for storing an indication of which initiator devices are entitled to access one or more data sources or destinations.

19. A semiconductor integrated circuit according to claim 12 in which the first store comprises a re-writeable memory.

20. A semiconductor integrated circuit according to claim 13 in which one of the data access rules specifies that all data access commands transmitted by the initiator devices identified in the first store are allowed by the data blocker.

21. A semiconductor integrated circuit according to claim 16 in which the second store is arranged to store pairs of start and end memory addresses of regions of memory corresponding to unprivileged data sources or destinations, and in which the data identification comprises an indication of a region of memory corresponding to the data source or destination being accessed, and in which the control circuit is arranged to determine that the data source or destination being accessed is unprivileged if the region of memory indicated in the data access command falls within any pair of start and end memory addresses stored in the second store.

22. A semiconductor integrated circuit according to claim 16 in which the second store comprises a re-writeable memory.

23. A semiconductor integrated circuit according to claim 18 in which the second store is arranged to store an indication of which initiator devices are entitled to access each data source or destination indicated in the first store.

24. A semiconductor integrated circuit according to claim 18 in which the second store comprises a re-writeable memory.

25. A television decoder, comprising:
one or more initiator devices and one or more data sources or destinations, each of the one or more initiator devices configured to request data access from or to a respective one of the one or more data sources or destinations by transmitting a data access command to the respective one data source or destination, the data access command including an initiator identification identifying the initiator device requesting the data access and a data identification identifying the respective one data source or destination that the initiator device is attempting to access;
a store portion arranged to store information identifying the one or more initiator devices and the one or more data sources or destinations and to store a list of identifications of which of the one or more initiator devices are secure;
a control circuit arranged to receive the data access command transmitted from each initiator device to the respective data source or destination, to generate an authorization signal according to whether the data access command satisfies one or more data access rules, and to determine that the initiator device that generated the data access command is secure if the initiator identification included in the data access command corresponds to one of the identifications in the list; and
a data blocker arranged to selectively block or allow the data access command in response to the authorization signal,
wherein the one or more data access rules depends on at least one comparison between the initiator identification and/or data identification comprised in the data access command and the information stored in the store portion.

26. A television decoder according to claim 25 for use in a pay-television system.

27. A television decoder according to claim 25 in which one of the data access rules specifies that all data access commands transmitted by an initiator devices not identified on the list are blocked by the data blocker.

28. A television decoder according to claim 25 in which the store portion further comprises a store for storing an indication identifying which of the one or more data sources or destinations are unprivileged, and in which the control circuit is arranged to determine that respective one data source or destination identified by the data identification included in the data access command is unprivileged if the data identification corresponds to one of the data sources or destinations identified by the indication in the store.

29. A television decoder according to claim 25 in which the store portion further comprises a first store for storing an indication of which initiators are entitled to access one or more data sources or destinations.

30. A television decoder according to claim 25 in which the one or more initiators include an initiator that is part of a security control circuit and in which one of the data access rules specifies that the store portion may only be accessed by the security control circuit.

31. The television decoder of claim 25 wherein the one or more initiator devices include one or more of a processor, a security control circuit, and a direct memory access device.

32. A television decoder according to claim 29 in which the first store is arranged to store an indication of which initiators are entitled to access each data source or destination indicated in a second store.

33. A method, comprising:
restricting access to data within an electronic device, the electronic device including one or more initiator devices and one or more data sources or destinations, the electronic device configured to perform the restricting access by,
storing information identifying the one or more initiator devices and the one or more data sources or destinations;
receiving from a respective one of the one or more initiator devices a data access command that includes an initiator identification identifying the respective initiator device issuing the data access command and a data identification identifying a respective one of the data sources or destinations that the respective initiator device is attempting to access;
generating an authorization signal according to whether or not the data access command satisfies one or more data access rules; and
selectively blocking or allowing the data access command in response to the authorization signal,
wherein the one or more data access rules depends on at least one comparison between the initiator identification and/or data identification comprised in the data access command and the stored information, and the data access rules include at least one rule which depends on whether the respective initiator device which generated the data access command is a secure or insecure device.

34. The method of claim 33 in which one of the data access rules specifies that all data access commands transmitted by insecure initiators are blocked.

35. The method of claim 33 in which one of the data access rules specifies that all data access commands transmitted by an identified one of the initiators are allowed.

36. The method of claim 33 in which at least one data access rule depends on whether data access is a read or write operation.

37. The method of claim 33 in which the data access rules include at least one rule which depends on whether the data source or destination being accessed is privileged or unprivileged.

38. The method of claim 33 in which one of the data access rules specifies that a data access command transmitted by a secure initiator and which is attempting to access a privileged data source or destination is blocked.

39. The method of claim 33, wherein the one or more initiator devices include one or more of a processor, a security control circuit, and a direct memory access device.

40. A system, comprising:
one or more initiator devices and one or more data sources or destinations, each of the one or more initiator devices configured to request data access from or to a respective one of the one or more data sources or destinations by transmitting a data access command to the respective one data source or destination, the data access command including an initiator device identification identifying the initiator device requesting the data access and a data identification identifying the respective one data source or destination that the initiator device is attempting to access;
a store portion arranged to store information identifying the one or more initiator devices and the one or more data sources or destinations, the store portion including a list of identifications of which of the one or more initiator devices are secure;
a control circuit arranged to receive the data access command transmitted from each initiator device to the respective data source or destination, to generate an authorization signal according to whether the data access command satisfies one or more data access rules, and to determine that the initiator device that generated the data access command is secure if the initiator device identification included in the data access command corresponds to one of the identifications in the list; and
a data blocker arranged to selectively block or allow the data access command in response to the authorization signal,
wherein the one or more data access rules depends on at least one comparison between the initiator device identification and/or data identification comprised in the data access command and the information stored in the store portion.

41. The system of claim 40, wherein the one or more initiator devices include an initiator device that is part of a security control circuit and in which one of the data access rules specifies that the store portion may only be accessed by the security control circuit, and in which the security control circuit is arranged to cause data to be loaded into the store portion during an initialization procedure in response to a verified configuration message.

42. The system of claim 40, the store portion further comprises a store for storing an indication identifying which of the one or more data sources or destinations are unprivileged, and in which the control circuit is arranged to determine that respective one data source or destination identified by the data identification included in the data access command is unprivileged if the data identification corresponds to one of the data sources or destinations identified by the indication in the store.

43. The method of claim 40, wherein the one or more initiator devices include one or more of a processor, a security control circuit, and a direct memory access device.

44. The system of claim 40, wherein the system is a set top box.

* * * * *